United States Patent [19]
Neely et al.

[11] Patent Number: 4,602,127
[45] Date of Patent: Jul. 22, 1986

[54] DIAGNOSTIC DATA RECORDER

[75] Inventors: James F. Neely, Washington; James E. Krass, Jr., Grosse Pointe Woods, both of Mich.

[73] Assignee: Micro Processor Systems, Inc., Sterling Heights, Mich.

[21] Appl. No.: 588,004

[22] Filed: Mar. 9, 1984

[51] Int. Cl.⁴ .............................................. G06F 13/00
[52] U.S. Cl. ....................... 179/2 A; 360/6; 360/53; 340/52 F; 364/431.03
[58] Field of Search ............... 179/2 A, 2 AM, 2 DP, 179/2 R; 346/14 MR, 33 R; 360/6, 40, 48, 53; 340/52 F, 53, 52 R, 870.16–870.18; 364/424, 431.01–431.12, 551; 371/53

[56] References Cited
U.S. PATENT DOCUMENTS

| 3,048,034 | 8/1962 | Schultz . |
| 3,409,252 | 9/1966 | Miller . |
| 3,469,252 | 9/1969 | Bet . |
| 3,626,367 | 12/1971 | Howard et al. . |
| 3,893,108 | 7/1975 | McBride, Jr. et al. . |
| 3,956,753 | 5/1976 | Armstrong et al. . |
| 4,031,363 | 6/1977 | Freeman et al. . |
| 4,067,061 | 1/1978 | Juhasz . |
| 4,072,850 | 2/1978 | McGlynn . |
| 4,113,980 | 9/1978 | Bell . |
| 4,125,894 | 11/1978 | Cashel et al. . |
| 4,137,553 | 1/1979 | Tokitsu et al. . |
| 4,149,148 | 4/1979 | Miller et al. . |
| 4,164,763 | 8/1979 | Briccetti et al. . |
| 4,179,740 | 12/1979 | Malin . |
| 4,188,618 | 2/1980 | Weisbart . |
| 4,194,349 | 3/1980 | Lane . |
| 4,216,779 | 8/1980 | Squires et al. . |
| 4,234,921 | 11/1980 | Kinoshita et al. . |
| 4,236,215 | 11/1980 | Callahan et al. . |
| 4,246,566 | 1/1981 | Endo et al. . |
| 4,258,421 | 3/1981 | Juhasz . |
| 4,267,569 | 5/1981 | Baumann et al. . |
| 4,270,174 | 5/1981 | Karlin et al. . |
| 4,271,402 | 6/1981 | Kastura et al. . |
| 4,277,772 | 7/1981 | Kastura et al. . |
| 4,293,842 | 10/1981 | Tanaka et al. . |
| 4,296,409 | 10/1981 | Whitaker et al. . |
| 4,297,693 | 10/1981 | Parsons . |
| 4,307,374 | 12/1981 | Bode et al. . |
| 4,309,900 | 1/1982 | Kreft et al. . |
| 4,317,106 | 2/1982 | Huber . |
| 4,317,364 | 3/1982 | Asano et al. . |
| 4,328,546 | 5/1982 | Kreft et al. . |
| 4,338,599 | 7/1982 | Leininger . |
| 4,361,870 | 11/1982 | D'Agostini et al. . |
| 4,504,831 | 3/1985 | Jahr et al. .................... 179/2 AM X |

Primary Examiner—James L. Dwyer
Attorney, Agent, or Firm—Harness, Dickey & Pierce

[57] ABSTRACT

A vehicular diagnostic system is described which generally comprises a portable communications control station and a remote data processing station. The control station includes a portable communications controller which is adapted to be connected to a vehicle data terminal capable of supplying parameter data monitored by a vehicle computer and connected to a source of electrical power in the vehicle. The controller also includes the circuitry required to enable the flow of the parameter data through the vehicle data terminal, to compose the data into a predetermined data stream, to record this data stream on magnetic tape, and transmit live or recorded data through a telephone line to the remote data processing station.

20 Claims, 7 Drawing Figures

Microfiche Appendix Included
(2 Microfiche, 103 Pages)

DIAGNOSTIC DATA RECORDER

MICROFICHE APPENDIX

This specification includes a microfiche appendix having two microfiche with one hundred and three frames.

BACKGROUND AND SUMMARY OF THE INVENTION

The present invention relates generally to vehicular diagnostic systems and particularly to a vehicular diagnostic system employing a portable communications control station.

With the advent of motor vehicles being equipped with computer control systems by the manufacturer, the repair of malfunctions has become substantially more sophisticated than in the past. In order for the vehicle computer to properly perform its control function, it typically interrogates a variety of sensors which are used to monitor various vehicle operating parameters. In several of these vehicle computer systems, as many as twenty or more sensors are employed for control purposes and to assist on-board diagnosis by the vehicle computer so that an immediate warning may be displayed to the vehicle operator. Examples of such vehicle computer systems are disclosed in the Kastura, et al., U.S. Pat. No. 4,277,772 issued on July 7, 1981, and the Baumann, et al., U.S. Pat. No. 4,267,569 issued on May 12, 1981, which are both hereby incorporated by reference.

In many vehicle models, means for obtaining direct access to the monitored parameter data on a real time basis is installed at the factory so that various display tools, engine analyzers and so forth may be used to facilitate a more complete diagnosis than that provided by the vehicle computer. For example, in many General Motors vehicle models, an Assembly Line Communications Link (ALCL) terminal is installed under the dashboard of the vehicle in the passenger compartment. This ALCL terminal is connected to an input/output (I/O) port of the vehicle computer or electronic control module (ECM) so as to permit the transmission of the monitored parameter data to the ALCL terminal upon the reception of the appropriate data enable signal at the ALCL terminal.

In the past, hand held display tools have been employed to selectively display the value or status of individual parameters. An example of such display tools are the "Mini-Scanner" model 5247 and the "Multi-Scanner" model 3818 display tools marketed by Micro Processor Systems, Inc., Sterling Heights, Mich. Each of these tools provide one connector which is used to obtain the parameter data from the ALCL terminal and another connector which is adapted to draw electrical power from the vehicle cigarette lighter. These tools also provide switches to adjust the tool to the appropriate vehicle model and select the parameter desired to be displayed on the light emitting diode (LED) display of the tool. Additionally, a "Video Scanner" circuit designed by Micro Processor Systems, Inc., for use in connection with an engine analyzer console has been employed to simultaneously display all of the parameter data available on the cathode ray tube (CRT) of the engine analyzer.

While the above-identified display devices have been found to be very effective in assisting the diagnosis of the engine and other vehicle systems by the automotive mechanic, the need exists to have the capability of employing the substantial computer power of a remote large scale data processor to analyze a variety of problems associated with a vehicle. Additionally, it is well known in the art that many vehicle problems or malfunctions occur intermittently or occur only under actual driving conditions. Thus even if the capabilities of a remote data processor are to be utilized, the need exists for a diagnostic system which is capable of collecting the parameter data during actual driving conditions and subsequently transferring this data to a remote data processor for analysis.

Accordingly, it is a principle objective of the present invention to provide a communications control station for a vehicular diagnostic system which is capable of both recording and transmitting vehicle parameter data to a remote data processor station.

It is another objective of the present invention to provide a communications control station which is capable of both transmitting and receiving voice and data communications.

It is a further objective of the present invention to provide a communications control station which is portable and is adapted to derive all of its operating power from the vehicle.

It is an additional objective of the present invention to provide a portable communications control station which is capable of checking the validity of the parameter data being recorded and/or transmitted.

It is yet another objective of the present invention to provide a portable communications control station which is capable of servicing a variety of vehicle models over a number of model years.

It is yet a further objective of the present invention to provide a portable communications control station which is capable of transmitting recorded or real time parameter data to the remote data processing station from inside the vehicle.

It is yet an additional objective of the present invention to provide a portable communications control station which is capable of employing a commercial display device for displaying selected parameter values, even while the parameter data is being recorded and/or transmitted to the remote data processor.

It is still another objective of the present invention to provide a vehicular diagnostic system in which telephone communication can be initiated at either the portable communication control station or the remote data processor station.

It is still a further objective of the present invention to provide a vehicular diagnostic system in which at least one electronically controlled device in the vehicle can be operated at the remote data processor station.

To achieve the foregoing objectives, the present invention provides a vehicular diagnostic system which generally comprises a portable communications control station and a remote data processor station. The control station includes a portable communications controller which comprises means for connecting the controller to a vehicle data link terminal capable of supplying parameter data monitored by the vehicle computer, means for connecting the controller to a source of electrical power in the vehicle, microcomputer means for enabling the flow of the parameter data through the data link terminal and for composing the data parameter data into a predetermined data stream, means for recording the data stream, and means for connecting the controller to a telephone line and for transmitting the data stream through the telephone line to the remote data processor station. Both the control station and the remote data processor station include telephone communication means for enabling both voice and data communication transfer on an alternative basis between the control station and the data processor station.

The present invention also provides a method of transferring parameter data, which generally comprises the steps of enabling the flow of the parameter data to the controller, composing the data into a predetermined data stream having at least one word for permitting the validity of the parameter data to be determined, and recording the data stream on magnetic tape. This method also includes the steps of playing back the recorded data stream, determining the validity of the recorded parameter data, and transmitting this data through a telephone line to the remote data processing station.

Additional advantages and features of the present invention will become apparent from a reading of the detailed description of the preferred embodiment which makes reference to the following set of drawings.

DETAILED DESCRIPTION OF THE PREFERRED EMBODIMENT

Figure 1:
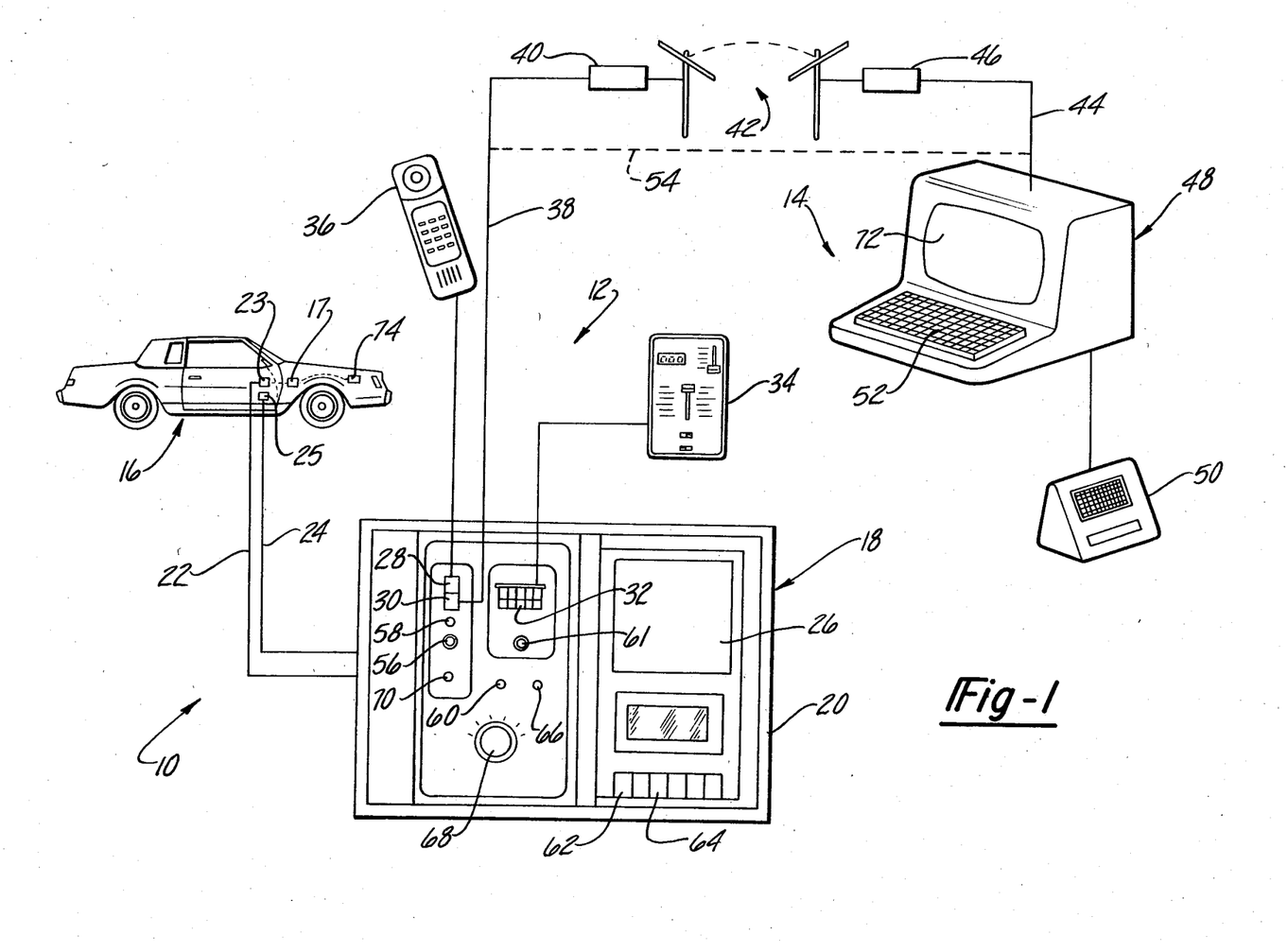
FIG. 1 is a diagrammatic view of a vehicular diagnostic system in accordance with the present invention.

Referring to FIG. 1, a diagrammatic view of a vehicular diagnostic system 10 according to the present invention is shown. The diagnostic system 10 generally comprises a portable communications control station 12 and remote data processing station 14. The control station 12 is adapted to be employed in connection with a vehicle 16 which is equipped with an on-board computer 17 or other data acquisition system that permits access to one or more of the operating parameters being monitored in the vehicle. Thus, for example, the vehicle 16 could be a General Motors automobile which is equipped with an ECM and an ALCL terminal for gaining access to the parameters monitored by the ECM. However, it should be understood that the present invention is not limited to any particular vehicle manufacturer, vehicle type or model year, or vehicle computer system, and that one of the advantages of the present invention is its versatility.

The control station 12 features a novel communications controller 18 which is conveniently housed in a molded plastic carrying case 20 of which only the bottom portion is shown for illustration purposes. The controller 18 provides for two connector cables 22 and 24 which are used to connect the controller to the vehicle 16. Specifically, the connector cable 22 is used to connect the controller 18 to a suitable vehicle data terminal 23, such as an ALCL terminal, which is capable of supplying data representative of the value or status of one or more of the operating parameters monitored by the vehicle computer 17. The connector cable 24 is used to connect the controller 18 to the vehicle cigarette lighter 25 or other appropriate source of electrical power in the vehicle 16.

Although it should be appreciated that the controller 18 could be modified to include its own self-contained source of electrical power, such a feature is considered unnecessary in view of the relatively low power consumption requirements of the control station 12 and in view of the fact that electrical power from the vehicle battery or alternator will also have to be supplied to the vehicle computer in order to obtain the parameter data needed for diagnosis. Accordingly, in the preferred embodiment all of the electrical power required to operate the controller 18 is provided by the vehicle.

As will be more fully described below, the controller 18 is adapted to transmit an enable signal along the connector cable 22 which will cause the vehicle computer to present the parameter data at the data link terminal in the vehicle 16 for transmission to the controller through the cable 22. Once this parameter data is received by the controller 18, the controller has the capability to direct this data to three different places. Firstly, the controller 18 includes a cassette recorder 26 which can be used to store the parameter data on magnetic tape. Secondly, the controller 18 includes a pair of telecommunication terminals 28 and 30 which can be used to transmit the data to the remote data processor station 14 via telephone communication, as will be more fully described below. Thirdly, the controller 18 includes a display terminal 32 for transmitting the data to a display device, such as mini-scanner display device 34.

It is important to note that the controller 18 is capable of concomitantly recording the data, transmitting the data to the remote data processor station 14, and transmitting the data to the display device 34. Additionally, the controller 18 is also capable of first recording the data, and then transmitting the recorded data to the remote data processor station 14 and/or transmitting this data to the display device 34 during a play back mode. Similarly, the parameter data may be recorded and/or transmitted to the remote data processor station 14 without the use of the display device 34.

The control station 12 also includes a conventional telephone 36 which is connected to the telecommunications terminal 28 of the controller 18 to establish telephonic communication with the remote data processing station 14. This provision also permits voice communication between the control station 12 and the data processing station 14. Both voice and data communication may be transmitted between the control station 12 and the data processing station 14 via a conventional telephone system, or alternatively along a local telephone loop. Thus, for example, in FIG. 1 a telephone extension line 38 is connected at one end to the telecommunications terminal 30 and connected to a conventional telephone wall plug 40 at the other end. Thereafter the voice or data communication is transferred, via the telephone system's telephone lines 42, microwave transmitters and so forth, to the remote data processing station 14.

At the remote data processing station 14, another telephone extension line 44 is connected at one end to a telephone wall plug 46 and at the other end to a computer terminal 48. A conventional speaker phone 50 or other telephone is also connected to the computer terminal 48 to permit voice communication at the data processing station 14. When a speaker phone is employed, the keyboard 52 of the computer terminal may be used to enter and automatically dial the telephone number of the control station telephone 36 in order to initiate telephone communications at the data processing station 14.

While the above described use of the telephone system may be advantageously used to permit the diagnosis of a vehicle 16 which is located thousands of miles away from the data processing station 14, a local telephone loop may also be employed in an application where the vehicle 16 is located within a few hundred feet of the data processing station 14. An example of such an application would be where the data processing station is located in a vehicle dealership, fleet service department, and the like. Accordingly, a telephone line 54 may be connected to the telephone extension lines 38 and 44, thereby bypassing the telephone system and still permitting the use of the telephone 36 and the speaker phone 50. As will be more fully described below, the computer terminal 48 for such an application includes a telephone driver circuit for providing the necessary electrical power for the local telephone loop.

From the foregoing description, it should be understood that telephone communication between the control station 12 and the data processing station 14 may be initiated by either the control station or the data processing station. For example, to initiate telephone communication from the control station 12, a "data/talk" switch 56 on the controller 18 is switched to the "talk" position. Then, the telephone 36 turned on and telephone number of the data processing station 14 is entered by the operator at the control station. The computer terminal 48 at the data processing station 14 will detect the ringing signal, answer the call, and alert the operator at the data processing station. Once voice communication between these operators is established, the control station operator switches the data/talk switch 56 to the "data" position. In a matter of seconds, a "ready" light 58 on the controller 18 will turn on to indicate that the computers in the controller 18 and the computer terminal 48 are located together. At this point, the computer terminal 48 will begin receiving parameter data from the vehicle 16, providing that the vehicle's ignition is turned on as well.

A "vehicle data" indicator light 60 is also provided on the controller 18 so that the control station operator will be able to confirm that parameter data from the vehicle 16 is flowing properly through the controller 18 and being transmitted to the data processing station 14. The vehicle data light 60 will flash in synchronization with the digitally HI and LO bit transmissions of the parameter data.

It should be noted at this point that the parameter data may be recorded at the control station 12 during the telephone transmission to the data processing station by manually switching a "record/play" switch 61 to the record position and depressing the "record" button 62 on the cassette recorder 26 in the controller 18. It should also be noted that where the parameter data being transmitted to the data processing station is recorded data rather than live or real-time data from the vehicle 16, the vehicle data indicator light 60 will also flash on and off to confirm that the recorded parameter data from the cassette recorder 26 is being properly transmitted from the controller 18 to the data processing station 14. When it is desired to transmit recorded parameter data to the data processing station 14, the telephone communication is established in the same manner as described above. However, prior to establishing this telephone communication, the cassette tape is first rewound to the appropriate position, the "play" button 64 on the cassette recorder 26 is depressed, and the "record/play" switch 61 is moved to the play position.

The controller 18 is also provided with a "data sync" indicator light 66 which is used to indicate that the computer in the controller 18 is properly synchronized with the flow of parameter data from the vehicle 16 in the recording mode. Additionally, in the play back mode, this light will also indicate that valid parameter data is being received from the cassette recorder 26. As will be discussed more fully below, the controller 18 does not merely record the data in the form that it is received from the vehicle. Rather, this data is composed into a predetermined data stream format before the data is recorded by the cassette recorder 26. This is done to permit the computer in the controller 18 to determine if the data being played back from the cassette recorder 26 is valid and if it is being properly transmitted to the data processing station 14. Additionally, since the controller 18 is adapted to receive parameter data from several different vehicle models, and hence from various vehicle computers, the format of the data received will typically vary in data length, rate of transmission and data content. Accordingly, the controller 18 operates to automatically compose the flow of the parameter data into a single or standard format for subsequent analysis at the data processing station.

Since various vehicle computers require different enable signals for causing the parameter data to be presented at the data link teminal to the vehicle, the controller 18 also includes a "diagnostic mode" six position rotary switch 68 for selecting the appropriate type of enable signal for the particular model of the vehicle to be diagnosed. Thus, for example, in the preferred embodiment position "B" of the rotary switch 68 is used for 1981 General Motors passenger vehicles and other model year passenger vehicles having "full function" vehicle computer systems. Additionally, it should be noted that the controller could include a provision which would permit the enable signal to be selected at the data processing station.

The controller 18 also includes a "call" indicator light 70 which is used to alert the control station operator that the data processing station operator wishes to switch from data communication back to voice communication. In the preferred embodiment, the data processing station operator can cause the call light 70 to turn on by simply depressing the appropriate key on the keyboard 52 of the computer terminal 48. This feature of the present invention is particularly advantageous because it permits the data processing station operator to convey the diagnosis of the vehicle problem immediately after the parameter data has been analyzed at the data processing station 14. Additionally, it may be desirable for the data processing station operator to request that the control station operator change one or more of the vehicle parameters, such as the engine speed, after an initial analysis of the parameter data before transmitting further data to the data processing station. It should also be noted that the control station operator may re-initiate voice communication with the data processing station operator by moving the "data/talk" switch 56 to the talk position. This will interrupt the flow of data and signal the data processing station operator via an appropriate message on the CRT 72 of the computer terminal 48.

Another important feature of the present invention is a provision which enables the data processing station operator to energize, de-energize or otherwise operate any electronically controlled device in the vehicle which is controlled by or through an appropriately programmed vehicle computer. Thus, for example, the used to provide a visual display of the parameter data on the screen of the CRT 72. An example of a typical parameter data display on the CRT screen of the computer terminal 48 is shown below in TABLE 1 for a 1984 General Motors' passenger vehicle having a "full function" vehicle computer system.

| 1984 FULL FUNCTION SYSTEM | | | | OPEN LOOP | | (C) 1983 |
|---|---|---|---|---|---|---|
| ENGINE SPEED (RPM) = | 2050 | VEHICLE SPEED (MPH) = | 18 | PROM ID NUMBER IS | | 153 |
| M/C SOLENOID DWELL = | 12 | COOLANT TEMP DEG C. = | 25 | EXHAUST GASES ARE | | LEAN |
| OXYGEN SENSOR (mV) = | 450 | TPS SENSOR VOLTS = | .12 | MAP or VAC VOLTS = | | 2.00 |
| BARD SENSOR VOLTS = | 4.00 | NOSE SWITCH | OFF | PARK/NEUTRAL SWITCH | | ON |
| A/C SWITCH | OFF | WOT SWITCH | OFF | EGR SOLENOID DWELL | | 48 |
| CCP SOLENOID | OFF | AIR CONTROL SOLENOID | OFF | AIR SWITCH SOLENOID | | ON |
| TCC SOLENOID | OFF | THIRD GEAR SWITCH | OFF | FOURTH GEAR SWITCH | | OFF |
| EFE SOLENOID | OFF | IDLE SPEED CONTROL | DOWN | SPARK COUNTS | | 152 |
| BATTERY VOLTAGE = | 13.0 | CROSSOVER COUNTS | 0 | | | |
| T CODES - 12, 15, 21, 24, 45, 51, 54, 55 | | | | | | |
| T CODE DESCRIPTION - 51 = PROM ERROR | | | | | | |
| F1 = RESTART  F3 = CALL  F5 = AIR    MODEM READY | | | | | | | vehicle 16 includes an air switch solenoid 74 which is used to control the supply of air to the exhaust manifold as an aid in reducing exhaust emissions. The vehicle computer is programmed to permit the air switch solenoid 74 to be operated by an appropriate air control signal received at the data link terminal. In accordance with the present invention, the data processing station operator can energize this solenoid by depressing a predetermined key on the keyboard 52 of the computer terminal 48. Additionally, it should be understood that the computer in the terminal 48 could also be appropriately programmed to automatically energize the solenoid 74 as part of the data analysis procedure employed at the data processing station 14. While this remote control aspect of the present invention is described in connection with the air switch solenoid 74, it will be appreciated that the principles of the present invention are also applicable to other electronically controlled devices and circuits in the vehicle. For example, and without limitation, the vehicle diagnostic system 10 may be readily adapted to remotely control carburetor or fuel mixture control solenoids and motors, electronic spark control circuits, idle speed control switches, torque converter control solenoids, exhaust gas recirculation solenoids. Additionally, in vehicle computers which employ electronically erasable and programmable memories for storing the vehicle computer application software or programs, the vehicle diagnostic system 10 is capable of being appropriately programmed to permit these vehicle computer memories to be re-programmed from the data processing station 14.

In one embodiment according to the present invention, the computer in the computer terminal 48 has the capacity to analyze the parameter data from the vehicle 16, as well as to remotely operate electronically controlled devices and circuits in the vehicle and provide telecommunication between the control station 12 and the data processing station 14. However, it should be understood that a separate, higher capacity computer could be connected to the computer terminal 48 for providing an analysis of the parameter data. Additionally, various peripheral devices, such as printers and so forth, could also be connected to the computer terminal 48.

While it may be advantageous for the data processing station computer to perform one or more pre-programmed tests on the parameter data transmitted by the controller 18, the computer terminal 48 may also be used to provide a visual display of the parameter data on the screen of the CRT 72. An example of a typical parameter data display on the CRT screen of the computer terminal 48 is shown below in TABLE 1 for a 1984 General Motors' passenger vehicle having a "full function" vehicle computer system.

It will be observed from TABLE 1 that in addition to displaying the parameter data, the computer terminal 48 also displays the identification of certain trouble (T) codes, which are generated by the vehicle computer to indicate a problem in a given circuit. For example, T code "51" is used to indicate that there is an error in the programmable read only memory (PROM) for the vehicle computer. The screen of the CRT 72 also displays the description of three programmable function keys (F1, F3, and F5) on the keyboard 52. Specifically, the "F1" function key is used to restart the flow of parameter data from the controller 18. The "F" function key is used for causing the call light 70 on the controller 18 to light up or flash, and the "F5" function key is used to energize the air switch solenoid 74 in the vehicle.

In one embodiment according to the present invention, the CRT 72 is also used to display various messages and prompts to assist the data processing station operator. For example, these messages and prompts include the description of function key "F9" which is used to initiate the sequence for placing a telephone call, a request for the telephone number of the control station to be entered via the keyboard 52, a menu of the vehicle model year and computer types, and a request to enter the appropriate model year and computer type of the vehicle to be analyzed.

Figure 2:
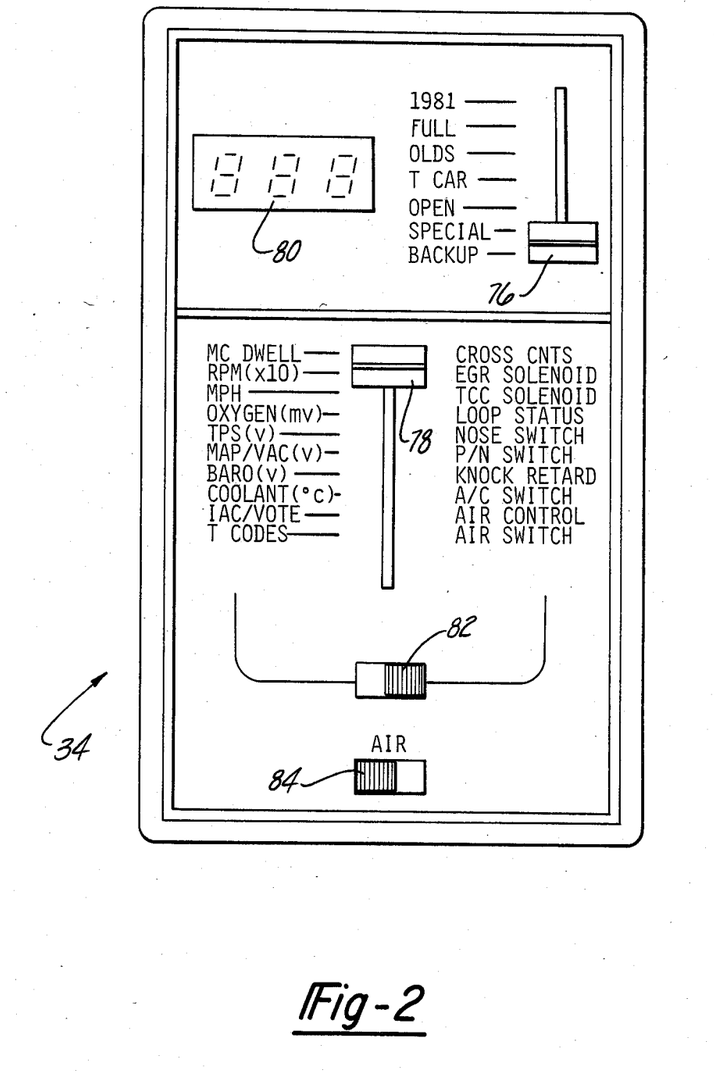
FIG. 2 is a front elevation view of the display device shown in FIG. 1.

Figuring to FIG. 2, a front elevation view of the mini-scanner display device 34 is shown. The mini-scanner shown provides an example of a commercial display device which may be connected to the controller 18 to display selected parameter data on either a real time or pre-recorded basis. The display device 34 includes a first slide switch 76 for selecting the appropriate computer system for the vehicle under test, and a second slide switch 78 to select the parameter desired to be displayed on the LED display 80. A switch 82 is also provided for selecting the parameters on either of the two columns of parameters available for display. Additionally, a spring biased switch 84 is provided for energizing the air switch solenoid in the vehicle. It should be noted that the controller 18 is adapted to permit the air switch solenoid 74 to be energized from either the data processing station 14 or from the control station 12 when the display device 34 is connected to the controller.

Figure 3A:
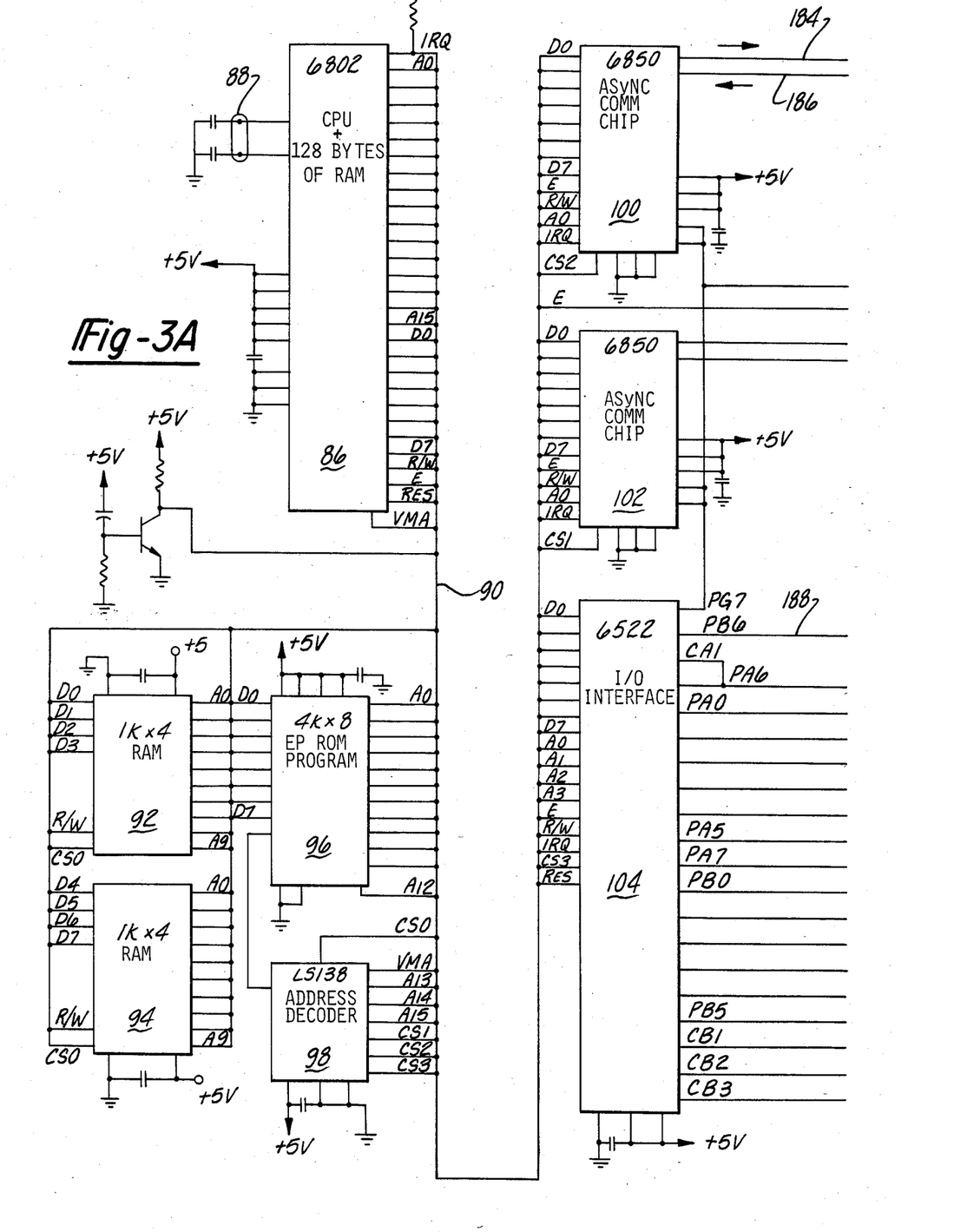
FIGS. 3A–3C represent a schematic diagram of the portable communications controller shown in FIG. 1.
Figure 3B:
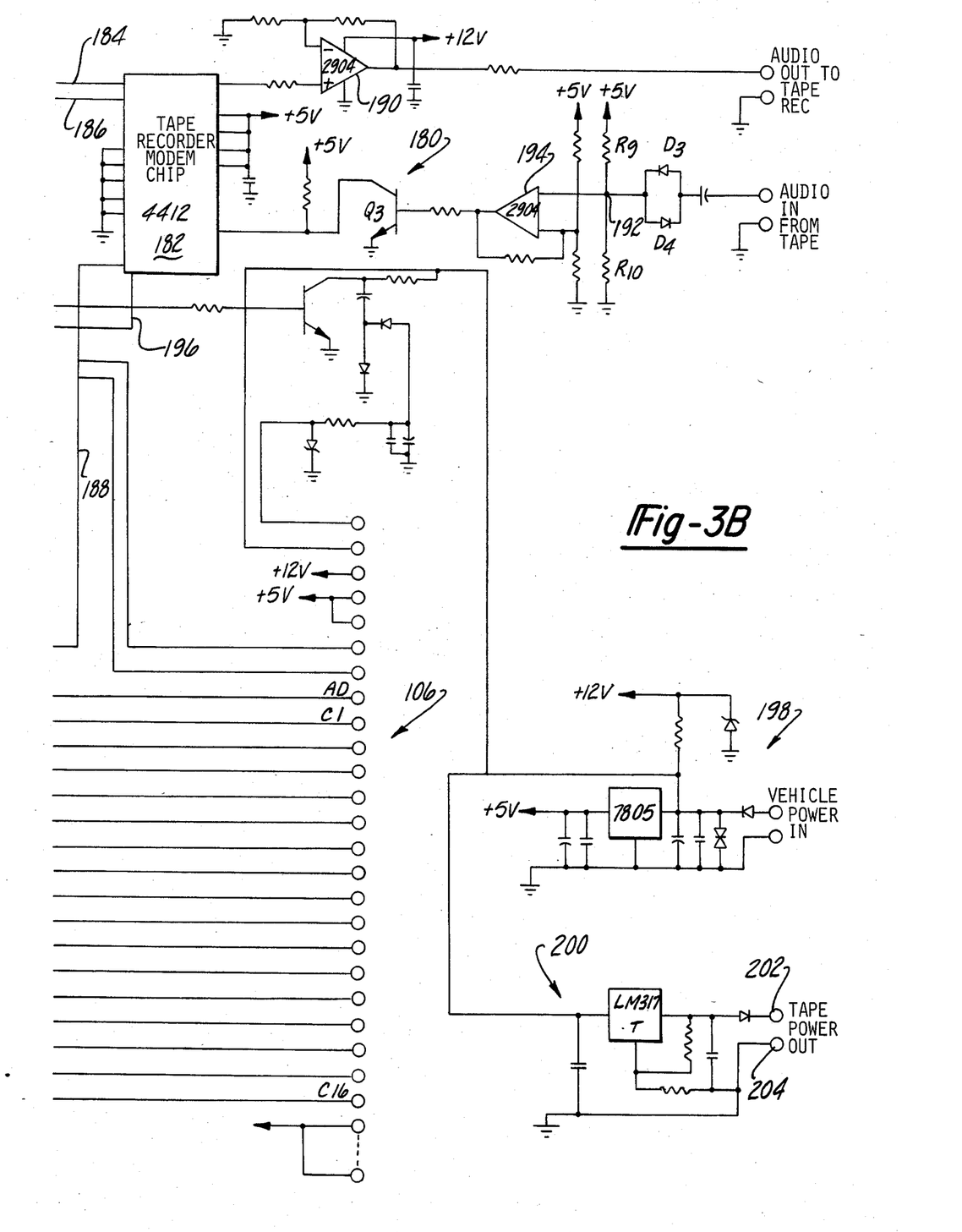
Figure 3C:
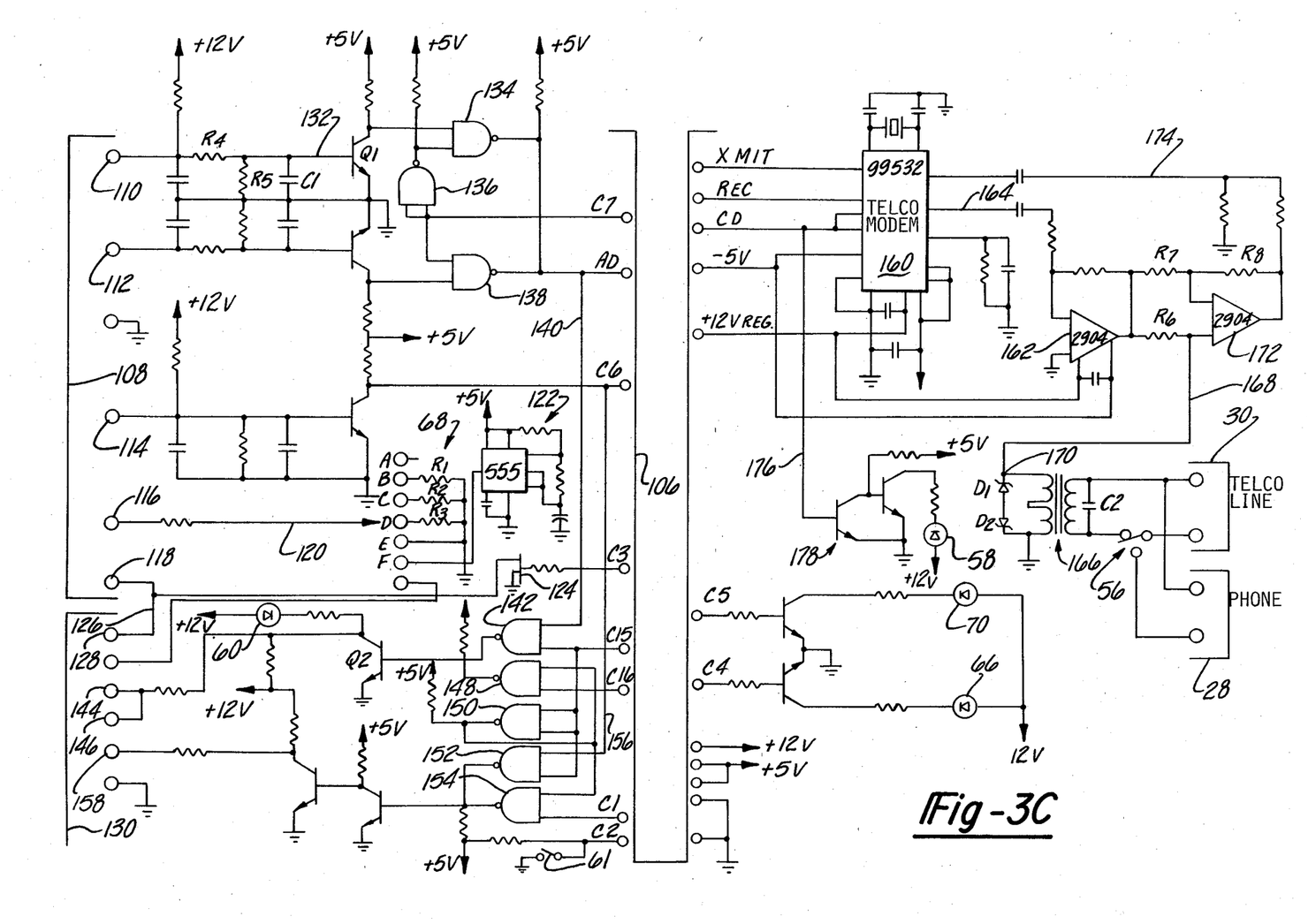

Referring to FIGS. 3A-3C a schematic diagram of the circuitry for the controller 18 is shown. The heart of controller circuit (IC) includes the central processing unit for the controller 18 and 128 bytes of random access memory (RAM). While in one embodiment according to the present invention the microcomputer 86 is a Motorola 6802 microcomputer IC, it should be noted that the present invention is not limited to this particular type of computer. Additionally, it should be understood that the principles of the present invention are applicable to a wide variety of circuit components, and the specific circuit components described below are intended to be only exemplary of one embodiment according to the present invention.

A crystal 88 is connected to the microcomputer 86 to provide 1 Mhz clock frequency required by the microcomputer. The microcomputer 86 includes an eight bit data port, a sixteen bit address port and several control pins, which are all connected to a bonus structure 90 which is shown as a single conductor for illustration purposes. The controller circuitry also includes three memory circuits 92-96 and an address decoder circuit 98. The memory circuits 92 and 94 are four-bit RAM memories which are connected such that the memory circuit 92 stores the four least significant bits (D0-D3) of an eight bit data word and the memory circuit 94 stores the four most significant bits (D4-D8) of the data word. The memory circuit 96 is an erasable programmable read only memory (EPROM) which is used to store the operating or application software for the controller 18. This software controls all of the data handling, recording and telecommunication functions of the controller 18 described above, and is set forth in a microfiche appendix hereto which is incorporated by reference.

The address decoder circuit 98 is used to direct data flow on the bus 90 to the appropriate circuit component. For example, the output conductor "CSO" from the address decoder 98 is used to enable the memory circuits 92 and 94 to read or write data present on the bus 90. Whether data is written or read from these memories depends upon the status of the "R/W" output pin of the microcomputer 86.

The remaining circuit components in the controller circuit directly connected to the bus 90 are two asynchronous communications interface adapter (ACIA) circuits 100-102 and a versatile interface adapter (VIA) circuit 104. The ACIA circuit 100 provides a serial interface between the microcomputer bus 90 and the tape recorder communications circuitry, while the ACIA circuit 102 provides a serial interface between the bus 90 and the telephone communications circuitry. The VIA circuit 104 provides a parallel input/output interface for the microcomputer via bus 90. As indicated in FIG. 3B, the pins of the VIA circuit 104 opposite the bus 90 are connected to a terminal, which is generally designated by reference numeral 106. The terminal 106 is used to connect the controller circuitry of FIGS. 3A and 3B with the controller circuitry of FIG. 3C.

FIG. 3C includes the interface circuitry for communication with the vehicle data link terminal, the display device 34, the telephone 36, and the telephone line 38. Referring first to communication with the vehicle 16, the controller circuitry includes a terminal 108 which is connected to the cable 22. In this embodiment, the terminal 108 provides for three inputs 110-114 from the vehicle and two outputs 116-118 from the controller. The input 110 is used to receive parameter data from vehicles having diesel or carbureted engines, while the input 112 is used to receive parameter data from vehicles having electronic fuel injected engines. The input 114 is used to receive the status on a particular parameter which in some vehicles is separated from the rest of the parameter data. Specifically, input 114 is used to receive the duty cycle of the mixture control solenoid which is used to change the air/fuel mixture in the engine's carburetor. Since this solenoid may typically turn on and off ten times a second, the vehicle computer provides a measurement of the duty cycle in degrees dwell.

The output 116 is used to transmit the appropriate enable signal to the vehicle computer which will cause the parameter data to be presented at the data link terminal, and hence transmitted via cable 22 to the terminal inputs 110-114. The output 116 is connected to the wiper arm 120 of the rotary switch 68 of the controller 18 to permit the proper enable signal to be selected by the control station operator. For example, in position "B" the output 116 is connected to ground through a resistor R1 (10k ohms) which will pull down the normally 5.1 volt level of the appropriate vehicle computer control line to 2.5 volts. This drop in voltage will provide the particular enable signal needed for the parameter data to be released by the vehicle computer. Another example of an enable signal is provided by position "F" on the rotary switch 68. In this position, a timer circuit 122 produces a clock signal which varies between five volts and ground at a rate by the vehicle computer in order to release the parameter data.

The output 118 is used to transmit the command signal for energizing the air switch solenoid 74. When this command signal is generated at the data processing station, it is transmitted via the bus 90 to the VIA circuit 104. The VIA circuit then directs the signal to pin "C3" of the terminal 106 where it is amplified to the appropriate voltage by the transistor 124 and transmitted to output 118 of the controller. As noted earlier, the controller 18 also permits the air switch solenoid 74 to be energized by the display device 34 when it is connected to the controller 18. Specifically, the output 118 is additionally connected via conductor 126 to pin 128 of the display device terminal 130 to receive the command signal which may be generated from the switch 84 of the display device 34.

After the parameter data is received at one or more of the inputs 110-114, it is first filtered before being transmitted to the VIA circuit 104. For example, with respect to parameter data from input 110, voltage dividing resistors R4 (56K ohm) and R5 (27K ohm) insure that the data signals exceed a minimum threshold voltage indicative of a HI digital logic state, and capacitor C1 (0.01 mf) removes extraneous noise from the data signals. The stream of binary signals representing the parameter data on conductor 132 then turn on and off the transistor Q1 which is used to provide the zero to five volt level swing required by the steering gates 134-138. These NAND gates are used to select which of the inputs 110 and 112 will be permitted to transmit parameter data to the microcomputer 86 via pin "AD" of the terminal 106. Specifically, the microcomputer 86 will cause a LO steering signal to be presented at pin "C7" of the terminal 106 when the input 110 is to be employed to transmit parameter data and a HI steering signal when the input 112 is to be employed to transmit the parameter data.

In addition to the outputs of NAND gates 134 and 138 being tied to pin "AD" of the terminal 106, a conductor 140 is also connected to this pin. The conductor 140 is used to permit the parameter being recorded or transmitted to the data processing station 14 through the microcomputer 86 to also be concomitantly transmitted to the display device 34. The conductor 140 is connected to a NAND gate 142 which will permit the parameter data to be transmitted to the outputs 144-146 of the display device terminal 130 when a HI select signal is present at pin "C15" of the terminal 106. The NAND gate 142 operates in combination with the NAND gates 148-154 to determine whether parameter data to be sent to the display device 34 is derived from data which has previously been recorded or live data strictly from the vehicle.

When the parameter data to be sent to the display device 34 is data which has previously been recorded, the microcomputer 86 will cause a LO select signal to be presented at pin "C15" of the terminal 106 as a result of the record/play switch 61 being switched to the play position (see pin "C2" of the terminal 106). This LO select signal will permit recorded parameter data to be transmitted from pins "C16" and "C1" (for the duty cycle of the mixture control solenoid) through the gates 148 and 154 respectively to the display device terminal 130. When live data is to be sent to the display device 34, it should be noted that the duty cycle parameter from 114 is transmitted via a conductor 156 to the NAND gate 152 where it passed through to the output 158 of the display device terminal 130.

As previously noted, one of the functions of the microcomputer 86 is to compose the parameter data received from the vehicle 16 into a predetermined data stream format before it is recorded or transmitted to the data processing station 14. Accordingly, before the previously recorded data can be sent to the display device 34 via NAND gates 148 and 154, it must be re-composed by the microcomputer into the original data format sent by the vehicle computer. Typically, this original format is comprised of a stream of twenty or more data words in which each word consists of nine bits. Each of these bits may be represented simply by a transition between a HI (12 volt) and a LO (0 volts) binary state or a particular transition time between these binary states. Thus, for example, the first word in data stream is usually a synchronization word, such as nine HI bits in a row to indicate the beginning of a data stream or set. Then, each of the other data words in the stream will typically begin with a HI to LO bit which is used to separate the eight bits containing the parameter data information.

In one embodiment according to the present invention, the microcomputer 86 composes the parameter data received from the vehicle 16 into a predetermined data stream format which includes a preamble eight bit word or byte. This preamble byte consists of alternating HI and LO bits because the vehicle computer generated synchronization word could be interrupted as a broken telephone line at the data processing station 14. After the preamble byte, a total byte is used to indicate the number of data bytes present in the data stream. This byte, as well as the last byte to be discussed below, permit the microcomputer 86 to check the validity of the parameter data after it has been recorded. Additionally, these two bytes permit the computer at the data processing station 14 to also check the validity of the data after it has been transmitted to the data processing station.

Following the total byte are two data rate bytes used to indicate the rate at which parameter data is being transmitted by the vehicle computer. Since different vehicle computers employ varying data transmission rates, the microcomputer 86 determines and identifies this rate so that the display device 34 will be able to adjust to the particular rate employed for the vehicle under test during a play back of recorded vehicle data.

The next word in the predetermined data stream is the duty cycle byte which represents the duty cycle of the air/fuel mixture solenoid in the vehicle. The remaining parameter data then follows the duty cycle byte. Finally, a check sum byte is employed for validity determination purposes. This check sum byte represents a binary summation of all previous bytes in the data stream.

When the microcomputer 86 determines that the parameter data being played back from the cassette recorder 26 is valid from a comparison of the total and check sum bytes with the actual binary values being played back, then it will cause the data sync indicator light 66 to turn on. This light is shown in FIG. 3C to be controlled from pin "C4" of the terminal 106. The call light 70 is also shown to be controlled in a similar manner via pin "C5" of this terminal.

As described above, the controller 18 also includes a vehicle data indicator light 60 which permits the control station operator to confirm that the parameter data is flowing properly through the controller. In FIG. 3C, the light 60 is shown to be connected to the output of transistor Q2. In this configuration, the light 60 will flash on and off regardless of whether the parameter data is live or pre-recorded and regardless of whether a display device is connected to the controller 18.

FIG. 3C also illustrates the telephone interface circuitry which is connected to the ACIA circuit 102 through the "XMIT" and "REC" pins of the terminal 196. After the parameter data has been composed into the predetermined data stream format discussed above, it is transmitted serially to the REC pin of the terminal 106 by the CIA circuit 102. A modem circuit 160 is then used to convert the HI and LO binary data signals into the particular audio frequencies suitable for being transmitted over the telephone line 38. Specifically, a 1270 hertz signal is employed for the HI binary state, and a 1070 hertz signal is employed for the LO binary state.

The output from the modem circuit 160 is connected to an op-amp 162 via conductor 154. The op-amp 162 is used as a line driver which provides a slight amplification, and matches the impedance required by the transformer 166 in combination with the resistor R6 (620 ohms). The op-amp 162 is connected through the resistor R6 to the transformer 166 via a conductor 168 and zener diodes D1 and D2. The transformer 166 is used to both transmit parameter data to the telephone line 38 and to receive command signals from the data processing station 14 via this telephone line. Accordingly, the conductor 168 is used to provide bidirectional communication between the controller 18 and the data processing station.

The zener diodes D1 and D2 are connected across one side of the transformer 166 to limit the voltage swing at node 170 to plus/minus five volts. The capacitor C2 (0.01 mf) is connected across the other side of the transformer 166 to remove any extraneous noise from any command signals which may be transmitted from the data processing station 14. Additionally, the data/talk switch 56 is shown connected to the transformer 166 such that the telephone 36 may be connected to voice communication with the data processing station via telephone line 38.

Command and other signals from the data processing station 14 are transmitted along conductor 168 to an op-amp 172. The op-amp 172 is connected as a differential amplifier which will selectively give unity gain to signals from the data processing station, while effectively not permitting signals from the op-amp 162 to pass through to conductor 174. This arrangement, which includes resistors R7 and R8 (both 22K ohms), forms a hybrid circuit that eliminates the need for any switch and enables the conductor 168 to simultaneously carry bidirectional signals.

As with signals transmitted from the control station 12, signals transmitted from the data processing station 14 are first converted into audio tones suitable for transmission through the telephone system. Specifically, a 2225 hertz frequency is used for a HI digital signal, and a 2025 hertz frequency is used for a LO digital signal. These audio frequencies on conductor 174 are re-converted back to HI and LO binary signals by the modem 160 and transmitted to the XMIT pin of the terminal 106.

As previously noted, the controller 18 also includes a ready indicator light 58. This light is turned on from a signal received at pin "CD" of the terminal 106 and transmitted via conductor 176 to transistor 178. This signal is given when there is sufficient energy in the telephone line to enable signals to be transmitted between control station 12 and the data processing station 14.

Referring again to FIG. 3B, a tape recorder interface circuit 180 is shown to be connected to the ACIA circuit 100. The interface circuit 180 includes a modem 182 for converting the HI and LO binary signals from the ACIA circuit 100 to audio signals suitable for recording on the cassette recorder 26. The modem 182 also reconverts these audio signals back to the binary signals during the playback mode. Data from the ACIA circuit 100 is transmitted to the modem 182 via conductor 184, while previously recorded data from the modem is transmitted to the ACIA circuit 100 via conductor 186.

Since the modem 182 is used to both transmit and receive audio signals at the same set of frequencies (1270 hertz for HI, 1070 hertz for LO), the mode for the modem must be controlled so that it will listen for the 1270 and the 1070 hertz tones, rather than the normal 2225 and 2025 hertz answering tones, when previously recorded parameter data is played back by the cassette recorder 26. Accordingly, a mode control signal from the VIA circuit 104 is transmitted to the modem 182 via conductor 188 to insure that the modem 182 stays in the originate mode, regardless of whether it is transmitting or receiving audio signals.

The recorder interface circuit 180 also includes an op-amp 190 which is connected as an aduio amplifier to provide a gain of three to the parameter data audio tones before being transmitted to the cassette recoder 26. When the parameter data audio tones are played back by the cassette recoder 26, these tones must first pass through diode pair D3 and D4. These diodes are used in combination with precision resistors R9–R10 (both 4.75K ohms) to shift the audio signal from the cassette recoder 26 up to a center of approximately 2.5 volts at node 192. A comparator 194 and a transistor Q3 are then used to shape the audio signal into a square wave form required by the modem 182. It should also be noted that the clock signal required by the modem 182 to operate is generated by the microcomputer 86, and transmitted to the modem via bus 90 and conductor 196.

Also shown in FIG. 3B are the two power supply circuits 198 and 200 for the controller 18. The power supply circuit 198 is used to tap the twelve volt electrical power from the vehicle 16 via cable 24, and provide both a twelve volt and regulated five volt source of power. The power supply circuit 200 is used to convert the twelve volt electrical power from the vehicle into a six volt power source for the cassette recoder across pins 202–204.

Figure 4A:
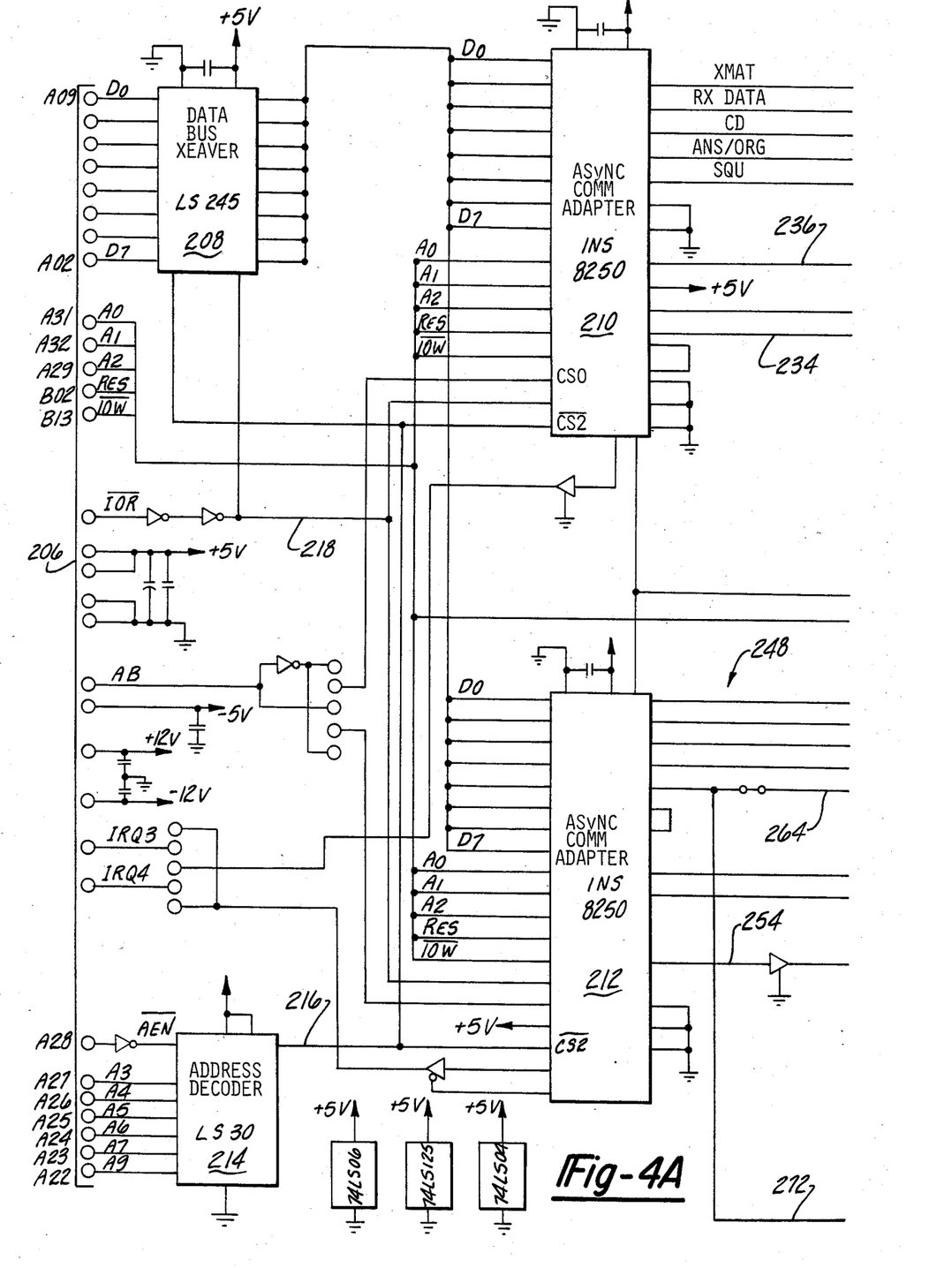
FIGS. 4A–4B are schematic diagrams of a communications circuit forming part of the remote data processor shown in FIG. 1.
Figure 4B:
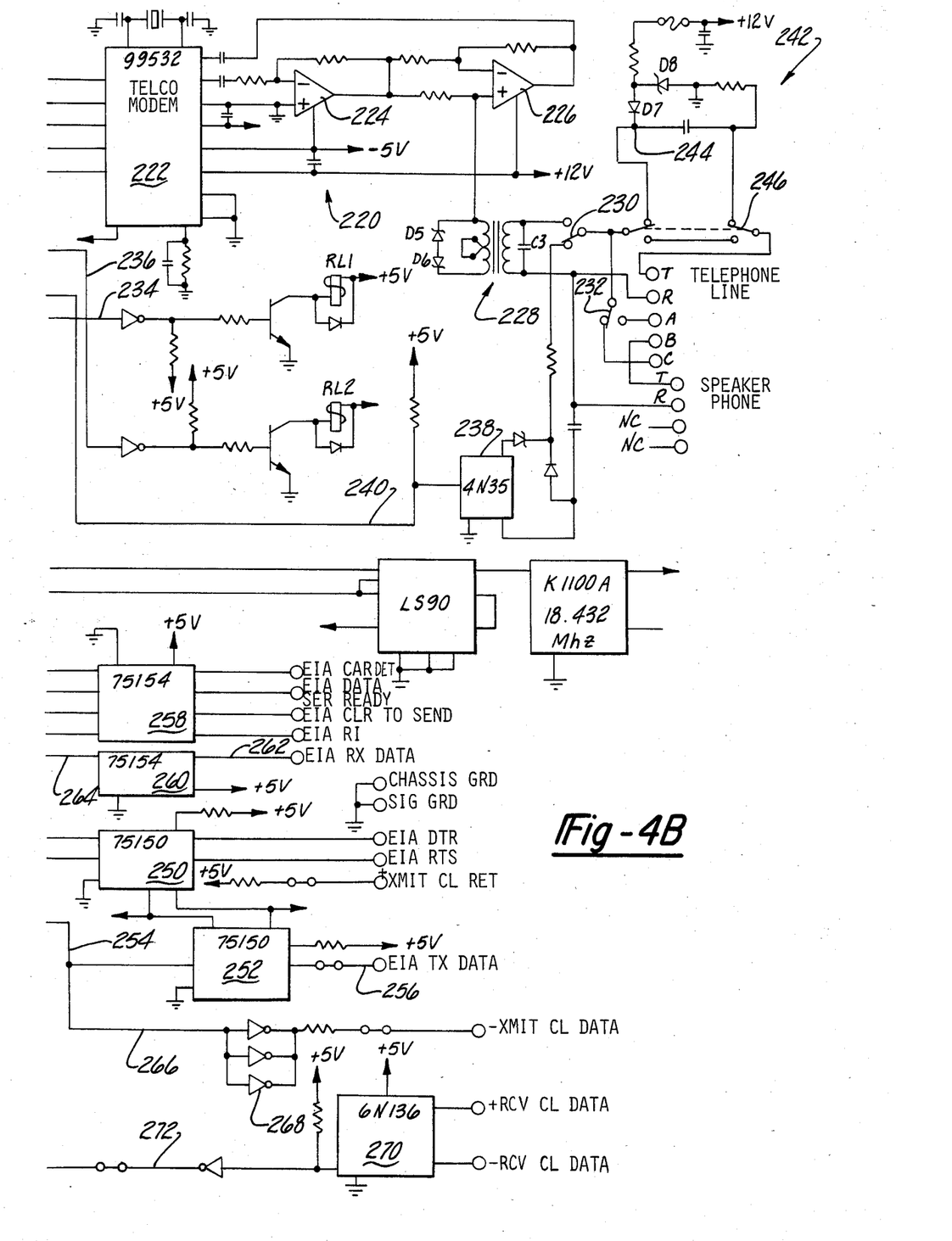

Referring now to FIGS. 4A and 4B, a schematic diagram of the communications circuitry for the computer terminal 48 is shown. This communication circuitry is used to permit telephone communications through the telphone line 44 and with the speaker phone 50. This communications circuitry also provides for an optional RS232 serial communication link with other devices which may be connected to the computer terminal, such as a printer or another computer.

The communications circuitry of FIGS. 4A and 4B is designed for placement on a circuit board which is adapted to be plugged into the bus structure of a commercial computer termnal. In the embodiment shown, the communications circuitry board is adapted to be plugged into an IBM personal computer. Accordingly, as shown in FIG. 4A, the communications circuitry includes a terminal 206 which is connected to the bus structure of the IBM personal computer. However, it should be understood that the communications circutry according to the present invention is not limited to any particular type of computer or computer terminal, and that other suitable computers or computer terminals may be used in the appropriate application.

The communications circuitry includes a transreceiver circuit 208 which operates as a bidirectional buffer between the IBM data bus and the two ACIA circuits 210-212 of the communications circuitry. An address decoder circuit 214 is provided to address the transreceiver circuit 208 and the ACIA circuits 210-212 via conductor 216. A control line 218 from the IBM bus is used to determine the direction of data flow through the transreceiver circuit 208 and the ACIA circuits 210-212.

The communications circuitry includes a telephone interface circuit 220 having several circuit components which are identical to those in the controller telephone interface circuit. These components include a modem 222, op-amps 224–226, zener diodes D5-D6, transformer 228, and capacitor C3. In the place of the data/talk switch 58 for the controller 18, the telephone interface circuit 220 includes a pair of electronically controlled switches 230–232 for alternately permitting voice communication through the speaker phone 50 and data communication through the telephone line 44. These two switches 230–232 are controlled by the relays "RL1" and "RL2", which are alternatively energized from the appropriate control signals transmitted by the ACIA circuit 210 along conductors 234–236, respectively.

The telephone interface circuit 220 also includes a ringing detector circuit 238 which is connected through switch 230 to the telephone line 44. The ringing detector circuit 238 is used to automatically detect that a telephone call has been placed to the computer terminal 48, so that the telephone call may be automatically answered at the data processing station. Briefly, when the detector circuit 238 detects the ringing signal of a telephone call, it will pull the voltage of the conductor 240 to the ground potential. This will cause the ACIA circuit 210 to place an interrupt signal "IRQ3" or "IRQ4" on the IMB bus which will enable the computer in the computer terminal 48 to answer the telephone call, and energize the relay RL2 to permit voice communication through the speaker phone 50.

The communications circuitry also includes a telephone line driver circuit 242 which is connected between the telephone interface circuit 220 and the telephone line 44. This line driver circuit is used when a local telephone loop is employed between the control station 12 and the data processing station 14. The line driver circuit 242 provides a nine volt potential at node 244 which is sufficient to create a current loop of at least twenty milli-amps between the control station 12 and the data processing station 14. This nine volt potential is determined principally by the voltage dividing diodes D7 (IN4007) and D8 (IN5529). The line driver circuit 242 also includes a double pole double throw switch 246 which is used to direct the audio signals through the line driver circuit when a local telephone loop is employed, or bypass this circuit when a commercial telephone system is employed.

The communications circuitry also includes an optional serial communications interface circuit, which is generally designated by reference numeral 248. While the use of such an interface does permit a much faster data transmission rate (9600 baud) than that provided by the telephone interface circuit (300 baud), the distance over which the data can be transmitted is generally limited to less than one hundred feet. Alternatively, in the place of the interface circuit 248, the communications circuitry could also be provided with another telephone interface circuit for permitting telephone communication between the computer terminal 48 and another computer.

The serial communications interface circuit 248 includes a pair of line driver circuits 250-252 which are connected to the ACIA circuit 212. These line drivers are used to transmit both the parameter data on conductor 254 and the control signals identified in FIG. 4B. The line driver circuit 252 converts the five volt HI binary signals and the zero volt LO binary signals on conductor 254 to plus twelve volts for the HI binary signals and minus twelve volts for the LO binary signals on the conductor 256.

The interface circuit 248 also includes a pair of line receiver circuits 258-260 which receive both data signals on conductor 262 and the control signals identified in FIG. 4B. The line receiver circuit 260 is used to convert the plus/minus twelve volt signals on conductor 262 to the zero and five volt binary levels on conductor 264.

The serial communications interface circuit 248 also permits data transfer via a local current loop in addition to or as an alterntive to the RS232 communication circuitry described above. Specifically, a conductor 266 is connected to the conductor 254 which provides the parameter data or other signals for transmission from the ACIA circuit 212. Three inverter circuits 268 are connected to the conductor 266 as current drivers for transmitting the data through the current loop. An opto-coupler circuit 270 is also provided for receiving signals along the current loop and for optically isolating the ACIA circuit 212 from the current loop. The output of the opto-coupler circuit 270 is connected to the conductor 264, and hence the ACIA circuit 212, via a conductor 272.

As in the case of the controller 18, the software used by the IBM personal computer in connection with the data processing stations's communications circuitry of FIGS. 4A and 4B is set forth in a microfiche appendix hereto, which is hereby incorporated by reference. This software includes all of the computer programs required to initiate and answer telephone calls, display the parameter data transmitted by the control station 14, check the transmitted parameter check for validity, and remotely control the air switch solenoid 74 in the vehicle 16.

It will be appreciated that the above disclosed embodiment is well calculated to achieve the aforementioned objectives of the present invention. In addition, it is evident that those skilled in the art, once given the benefit of the foregoing disclosure, may now make modifications of the specific embodiment described herein without departing from the spirit of the present invention. Such modifications are to be considered within the scope of the present invention which is limited solely by the scope and spirit of the appended claims.

We claim:

1. A portable communications controller for a vehicular diagnostic system comprising:
    means for connecting said controller to a vehicle data terminal capable of supplying data representative of a plurality of parameters monitored by a vehicle computer;
    means for connecting said controller to a source of electrical power in the vehicle;
    microcomputer means for enabling the flow of said parameter data through said data terminal and for composing said parameter data into a predetermined data stream;
    means for recording said data stream;
    means for connecting said controller to a telephone line and for transmitting said data stream through said telephone line to a remote diagnostic data processor.

2. The invention according to claim 1, wherein said microcomputer means includes means for concomitantly directing said data stream to said means for recording and said means for connecting said controller to a telephone line, thereby permitting said data stream to be concomitantly recorded and transmitted through said telephone line.

3. The invention according to claim 1, wherein said controller includes means for alternatively permitting both voice and data communication transfer between said controller and said diagnostic data processor through said telephone line.

4. The invention according to claim 1, wherein said controller includes means for connecting said controller to a portable scanning apparatus and for transmittng said parameter data for selectable display on said scanning apparatus.

5. The invention according to claim 1, wherein said predetermined data stream includes at least one data word for enabling said microcomputer means to check the validity of said parameter data after said data stream has been recorded.

6. The invention according to claim 1, wherein said controller includes means for perceptibly indicating the flow of said parameter data through said controller.

7. The invention according to claim 5, wherein said means for recording includes a cassette recorder having means for playing back said recorded data stream.

8. The invention according to claim 7, wherein said controller includes means for perceptibly indicating the validity of recorded parameter data during a playback mode.

9. The invention according to claim 1, wherein said controller includes means for receiving parameter data from a plurality of different vehicle models.

10. A diagnostic system for a vehicle comprising:
a portable communications control station having means for receiving data which is representative of a plurality of parameters monitored by a vehicle computer, means for recording said data, and first telephone communication means for transmitting and receiving both data and voice communications; and
a diagnostic data processing station located remotely from said control station for displaying data transmitted from said control station, said data processing station having second telephone communication means for enabling both voice and data communication transfer between said control station and said data processing station.

11. The invention according to claim 10, wherein said data processing station includes means for remotely operating at least one electronically controlled device in said vehicle.

12. The invention according to claim 11, wherein said electronically controlled device in said vehicle is a solenoid.

13. The invention according to claim 10, wherein said second telephone communications means includes a telephone line driver circuit for enabling communication between said control station and said data processing station through a local telephone loop.

14. The invention according to claim 10, wherein said second telephone communications means includes means for detecting the presence of a ringing signal for a telephone call placed to said data processing station.

15. The invention according to claim 10, wherein at least one of said first and second telephone communication means includes means for permitting bidirectional tele-communication signal transmission on a single electrical conductor.

16. The invention according to claim 10, wherein said data processing station includes a computer terminal connected to a telephone line and a speaker phone connected to said computer terminal.

17. A method of transferring data in a vehicular diagnostic system, comprising the steps of:
enabling the flow of data representative of a plurality of parameters monitored by a vehicle computer;
composing said data into a predetermined data stream having at least two words for permitting the validity of said parameter data to be determined, one of said validity determining words being a total of the number of data words in said stream and the other of said validity determining words being a total of all of the previous words in said stream; and
recording said data stream on magnetic tape.

18. The method according to claim 17, including the steps of playing back said recorded data stream and determining the validity of said recorded parameter data in said data stream.

19. The method according to claim 18, further including the step of concomitantly transmittng said recorded data stream through a telephone line during the playing back of said recorded data stream.

20. The method according to claim 19, additionally including the step of perceptibly indicating the validity of said parameter data in said recorded data stream.

* * * * *

UNITED STATES PATENT AND TRADEMARK OFFICE
CERTIFICATE OF CORRECTION

PATENT NO. : 4,602,127

DATED : July 22, 1986

INVENTOR(S) : JAMES F. NEELY and JAMES E. KRASS, JR.

It is certified that error appears in the above-identified patent and that said Letters Patent is hereby corrected as shown below:

Column 5, line 39, delete "located" and substitute therefor --locked--.
Column 8, line 32, delete "F" and substitute therefor --F3--.
Column 8, line 68, after controller, insert --circuitry is a microcomputer chip 86 shown in Figure 3A. This integrated--
Column 9, line 16, delete "bonus" and substitute therefor --bus--.
Column 9, line 38, insert --into-- after written.
Column 10, line 28, insert --required-- after rate.
Column 11, line 13, delete "strictly" and substitute therefor --directly--.
Column 12, line 37, delete "196" and substitute therefor --106--.
Column 12, line 40, delete "CIA" and substitute therefor --ACIA--.
Column 12, line 47, delete "154" and substitute therefor --164--.
Column 12, line 66, delete "data/-talk" and substitute therefor --data/talk--.
Column 12, line 68, delete "to" and substitute therefor --for--.
Column 13, line 56, delete "aduio" and substitute therefor --audio--.
Column 13, line 58, delete "recoder" and substitute therefor --recorder--.
Column 13, line 64, delete "recoder" and substitute therefor --recorder--.
Column 14, line 11, delete "recoder" and substitute therefor --recorder--.
Column 14, line 17, delete telphone" and substitute therefor --telephone--.
Column 14, line 25, delete "termnal" and substitute therefor --terminal--.
Column 14, line 31, delete "circutry" and substitute therefor --circuitry--.

UNITED STATES PATENT AND TRADEMARK OFFICE
CERTIFICATE OF CORRECTION

PATENT NO. : 4,602,127        Page 2 of 2

DATED : July 22, 1986

INVENTOR(S) : JAMES F. NEELY and JAMES E. KRASS, JR.

It is certified that error appears in the above-identified patent and that said Letters Patent is hereby corrected as shown below:

Column 14, line 51, delete "data/-talk" and substitute therefor --data/talk--.

Column 15, line 5, delete "IMB" and substitute therefor --IBM--.

Column 15, line 58, delete "alterntive" and substitute therefor --alternative--.

Column 16, line 58, delete "transmittng" and substitute therefor --transmitting.

Column 18, line 31, delete "transmittng" and substitute therefor --transmitting--.

Signed and Sealed this

Seventh Day of April, 1987

Attest:

DONALD J. QUIGG

Attesting Officer      Commissioner of Patents and Trademarks